(12) United States Patent
Huang

(10) Patent No.: US 10,500,815 B2
(45) Date of Patent: Dec. 10, 2019

(54) METHOD OF MAKING THE AQUAPLANE, THE AQUAPLANE AND THE INFLATABLE POOL

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 15/647,767

(22) Filed: Jul. 12, 2017

(65) Prior Publication Data
US 2018/0297323 A1     Oct. 18, 2018

(30) Foreign Application Priority Data
Apr. 14, 2017   (CN) ..................... 2017 2 0391889 U

(51) Int. Cl.
*B32B 7/04*     (2019.01)
*E04H 4/14*    (2006.01)
(Continued)

(52) U.S. Cl.
CPC ............ *B32B 7/04* (2013.01); *B63B 35/7909* (2013.01); *B63B 35/7913* (2013.01);
(Continued)

(58) Field of Classification Search
CPC ................ B32B 7/07; B32B 7/05; B32B 7/06
(Continued)

(56) References Cited

U.S. PATENT DOCUMENTS

| 2009/0004936 A1* | 1/2009 | Mollis ................. B63B 35/7913 441/66 |
| 2013/0137319 A1* | 5/2013 | Haller ................. B63B 35/7913 441/66 |

(Continued)

FOREIGN PATENT DOCUMENTS

| CN | 206984274 | 2/2018 |
| FR | 2978115 | 1/2013 |
| FR | 2978115 A1 | 1/2013 |

OTHER PUBLICATIONS

Partial European Search Report and Written Opinion from European Application No. 17181750.5, 8 pages, Search completed Jan. 10, 2018.

(Continued)

*Primary Examiner* — Lauren A Crane

(74) *Attorney, Agent, or Firm* — AJ Moss; Dickinson Wright PLLC

(57) ABSTRACT

A method of making an aquaplane is provided. The method includes flattening a fabric layer and a bottom layer with a waterproof characteristic, where the pull-string layer has a first pull-string layer, a second pull-string layer and multiple pull lines, one end of the pull line holds the first pull-string layer, and the other end of the pull line holds the second pull-string layer; using a roller laminates the fabric layer, the pull-string layer and the bottom layer, where a portion surface of the fabric layer and the bottom layer are melted, and respectively mixed with the surface gluing of the first pull-string layer and the second pull-string layer to produce a fixed microstructure; and cutting a shape of the aquaplane from the lamination of the fabric layer, the pull-string layer, and the bottom layer.

3 Claims, 8 Drawing Sheets

(51) Int. Cl.
C08L 27/06 (2006.01)
D03D 1/02 (2006.01)
E04H 4/00 (2006.01)
B63B 35/79 (2006.01)
A63G 21/18 (2006.01)

(52) U.S. Cl.
CPC ............... C08L 27/06 (2013.01); D03D 1/02 (2013.01); E04H 4/0025 (2013.01); E04H 4/14 (2013.01); A63G 21/18 (2013.01); B32B 2250/24 (2013.01)

(58) Field of Classification Search
USPC .......................................................... 4/506
See application file for complete search history.

(56) References Cited

U.S. PATENT DOCUMENTS

2014/0364022 A1  12/2014  Dingel
2016/0200405 A1  7/2016   Kim

OTHER PUBLICATIONS

Extended European Search Report dated Dec. 2, 2018, issued by the European Patent Office for related European Patent Application 17181750.5.

* cited by examiner

METHOD OF MAKING THE AQUAPLANE, THE AQUAPLANE AND THE INFLATABLE POOL

CROSS-REFERENCE TO RELATED APPLICATIONS

This application claims the benefit of priority to Chinese Patent Application No. 201720391889.X, titled "THE METHOD OF MAKING THE AQUAPLANE, THE AQUAPLANE AND THE INFLATABLE POOL", filed on Apr. 14, 2017, the entire disclosure of which are incorporated herein by reference.

TECHNICAL FIELD

The present disclosure relates to a method of making an aquaplane, an aquaplane and a pool device, and more particularly to a method of making the aquaplane, an inflatable aquaplane and an inflatable pool device.

BACKGROUND

Since the beginning of an ancient time, multiple people have been strongly passionate on water sports. As civilization and human life improve, a variety of products are developed successively in order to increase interest on the water sports, such as an aquaplane and a pool.

The aquaplane may be designed into a different size and shape to meet the different needs. For example, the aquaplane may be made into the shape of a surfboard in order to surf. The aquaplane may let a user hold a rope to stand on the aquaplane and use a ship to drag the rope in order to start related water sports. The aquaplane may also do the slower water sports with a paddle. Moreover, the aquaplane may be the usage of life-saving and practice to protect a security of the user or an assist equipment for swimming practicing.

The aquaplane is usually made from a material with smaller density to ensure the aquaplane may float on top of the water instead of sinking into the water. However, the aquaplane such as a surfboard is quite inconvenient to carry because of bigger size.

In addition, because of quite high relation with manufacture cost, price of the aquaplane is still higher. If it is possible to use an easier and effective way, and lower cost to make the aquaplane, lives for the people will be more interesting and diversity.

SUMMARY

According to the first embodiment of the present invention provides a method of making an aquaplane. The method includes the following steps:

First, flatten a fabric layer and a bottom layer. In order to make a great amount, the fabric layer and the bottom layer may be rolled into a reel in advance to be conveniently placed. The fabric layer and the bottom layer may be made from materials of PVC, TPE (Thermoplastic Elastomer) or PU (Thermoplastic polyurethanes). The fabric layer and the bottom layer have a waterproof characteristic.

Moreover, heating the fabric layer and the bottom layer make the surface of the fabric layer and the bottom layer generate a melted result of soft.

Flatten a pull-string layer and glue both sides of the pull-string layer.

The pull-string layer has the first pull-string layer, the second pull-string layer and multiple pull lines. Gluing on the both sides is to glue a first surface of a first pull-string layer and the first surface of a second pull-string layer. A second surface of the first pull-string layer and the second surface of the second pull-string layer are respectively opposite surfaces of the first surface of the first pull-string layer and the first surface of the second pull-string layer. One end of each pull line is fixed and related to the second surface of the first pull-string layer. The other end of each pull line is fixed and related to the second surface of the second pull-string layer.

Baking the pull-string layer with both sides of gluing may evaporate solvent in glue in order to avoid a plump phenomenon. Moreover, it may strengthen adhesion of gluing and fasten time of gluing solidification to fasten efficiency of the following processes through the step.

Using a roller laminates the fabric layer, the pull-string layer and the bottom layer. Through heating in advance or heating the roller of lamination makes the materials of the surface of the fabric layer be melted and mixed with the gluing on the surface of the first pull-string layer to produce the first fixed microstructure in order to fix and relate to the fabric layer and the first pull-string layer. Moreover, the materials of the surface of the bottom layer are melted and mixed with the gluing on the surface of the second pull-string layer to produce the second fixed microstructure in order to fix and relate to the bottom layer and the second pull-string layer.

After the fabric layer, the bottom layer and the glue cooling down, the fixed microstructure may let the fabric layer and a first pull line of the pull-string layer keep the condition of closing paste and may also let the bottom layer and a second pull line of the pull-string layer generate a condition of closing paste.

Cut a shape of the aquaplane from the lamination of the fabric layer, the pull-string layer, and the bottom layer.

Connecting the fabric layer and the bottom layer makes an inflatable chamber between the first pull-string layer and the second pull-string layer. After inflating the inflatable chamber, the multiple pull lines hold the first pull-string layer and the second pull-string layer to make the inflatable chamber keep a predetermined shape of the aquaplane.

In other words, a process of making the aquaplane be done may be simplified into using the fabric layer, the bottom layer, and the pull-string layer pluses the cutting and placing an inflatable hole. Because of an inflatable way to keep the shape of the aquaplane, the aquaplane may be quite folded, blended to have higher convenience to carry after the aquaplane discharging the air from the inflatable chamber.

When practicing, heating temperature of the fabric layer and the bottom layer may be set between one hundred and twenty degrees and two hundred degrees. The temperature may let the surface of the materials such as PVC generate the melted phenomenon of soften.

Moreover, the first pull-string layer, the second pull-string layer and the pull lines may be made in a weaving way. The first pull-string layer and the second layer respectively have multiple rugged patterns on the surface of the fabric layer and the bottom layer. The multiple rugged patterns may be made from the bump on the surface of weaving lines. The first fixed microstructure and the second fixed microstructure are respectively inserted into multiple rugged patterns in order to produce the better fixed and related effect.

Moreover, when practicing, it may further press patterns to the laminated fabric layer, the pull-string layer and the bottom layer. For example, pressing the surface with the bump patterns of the fabric layer and the bottom layer by the roller makes the surface of the fabric layer and the bottom layer produce some stereoscopic line structures. The pressing patterns on the surface of the fabric layer and the bottom layer to produce the patterns may strengthen the structure characteristics of the fabric layer and bottom layer.

When practicing, it may include a thing that the laminated fabric layer, pull-string layer and the bottom layer are contacted to the cool down wheel to lower the temperature. In other words, if there is no directly cutting for the aquaplane, it may roll the laminated fabric layer, pull-string layer and bottom layer into the reel and store. Before rolling into the reel, the laminated fabric layer, pull-string layer and the bottom layer may pass the cool down wheel first to make the fixed microstructure have a better intensity of closing paste before rolling into the reel and cool down.

In the practicing steps, when using the roller to laminate the fabric layer, the pull-string layer and the bottom layer, adjust the tension of the roller to ten kilograms to hundred kilograms to make the laminated surface be predetermined flatted characteristic. For example, using two rollers hold two sides of the processing materials and adding quite strengthen tension to flat the fabric layer, the pull-string layer and the bottom layer makes flatter than artificial gluing. Moreover, for a diffident area of material, the gluing characteristic and a roughness on the surface, all may adjust the tension to achieve different needs of the intensity and flatness.

Moreover, in the practicing steps, when using the roller to laminate the fabric layer, the pull-string layer and the bottom layer, it may heat the roller to make the surface of the fabric layer and the bottom layer become portion melted to mix with the glue more evenly and produce the first microstructure and the second microstructure. A heated temperature of the roller may be set between one hundred and twenty degrees and two hundred and twenty degrees.

Moreover, in the practicing steps, speeds of using the roller to laminate the fabric layer, the pull-string layer and the bottom layer may be set between one meter and ten meters per minute. In the speed, the fixed microstructure between the fabric layer, the pull-string layer and the bottom layer may generate the better form to achieve the exactly intensity of closing paste.

When making the aquaplane, set the inflatable hole on the surface of the fabric layer and the bottom layer and direct air into the inflatable chamber through the inflatable hole. The inflatable hole may place a plastic and metal ring and be fixed on the fabric layer and the bottom layer by gluing or other ways.

In the practicing steps, when gluing the both sides of the pull-string layer, the pull-string layer may be stretched using a tension between ten kilograms and hundred kilograms. It is possible to make the glue more evenly by stretching with the tension.

According to another embodiment of the present invention, providing an aquaplane device. The aquaplane device includes a fabric layer, a bottom layer and a pull-string layer.

The fabric layer and the bottom layer may be made of a material such as PVC, TPE (Thermoplastic Elastomer), or PU (Thermoplastic polyurethanes). The fabric layer and the bottom layer have the water proof characteristic.

The surface of the fabric layer and the bottom layer have embossed pattern to increase the structural intensities of the fabric layer and the bottom layer.

The pull-string layer has the first pull-string layer, the second pull-string layer and multiple pull lines. The portion surface of the fabric layer is melted and mixed with the glue on the surface of the first pull-string layer to produce the first fixed microstructure to be fixed and related to the fabric layer and the first pull-string layer. The portion surface of the bottom layer is melted and mixed with the glue on the surface of the second pull-string layer to produce the second fixed microstructure to be fixed and related to the bottom layer and the second pull-string layer.

An inflatable hole for directing air into the inflatable chamber between the first and second pull-string layers. After the inflatable chamber is inflated, the multiple pull lines hold the first and second pull-string layers so that the inflatable chamber retains a predetermined shape of the aquaplane device.

In addition to an inflatable chamber, there are two or more inflatable chambers that may be individually closed in the aquaplane, so that even if one of the inflatable chambers is perforated, the entire aquaplane may not lose buoyancy immediately, the safety of the person may be further secured. Multiple individually enclosed chambers may be blocked by means of a valve or may be set directly as an isolated inflatable chamber.

In addition, such a structure may also be used to make an inflatable pool device. The inflatable pool device has a fabric layer and a bottom layer. The fabric layer and the bottom layer may be made of a material such as PVC, TPE (Thermoplastic Elastomer), or PU (Thermoplastic polyurethanes). The fabric layer and the bottom material layer have the waterproof characteristics.

The surface of the fabric layer and the bottom layer have embossed pattern to increase the structural strength of the fabric layer and the bottom layer.

The pull-string layer has the first pull-string layer, the second pull-string layer and multiple pull lines. The portion surface of the fabric layer is melted and mixed with the glue on the surface of the first pull-string layer to produce the first fixed microstructure to be fixed and related to the fabric layer and the first pull-string layer. The portion surface of the bottom layer is melted and mixed with the glue on the surface of the second pull-string layer to produce the second fixed microstructure to be fixed and related to the bottom layer and the second pull-string layer.

An inflatable hole for directing air into the inflatable chamber between the first and second pull-string layers. After the inflatable chamber is inflated, the multiple pull lines hold the first and second pull-string layers so that the inflatable chamber retains a predetermined shape of the aquaplane device.

The structure may also be used in other water sports devices or inflatable mattresses and other products. The above aquaplane also includes other shapes or products that may be used with floating water, which may be held above the aquaplane, or a structure such as a backrest, a chair; all may be interpreted as the aquaplane mentioned here.

DETAILED DESCRIPTION

Figure 1:
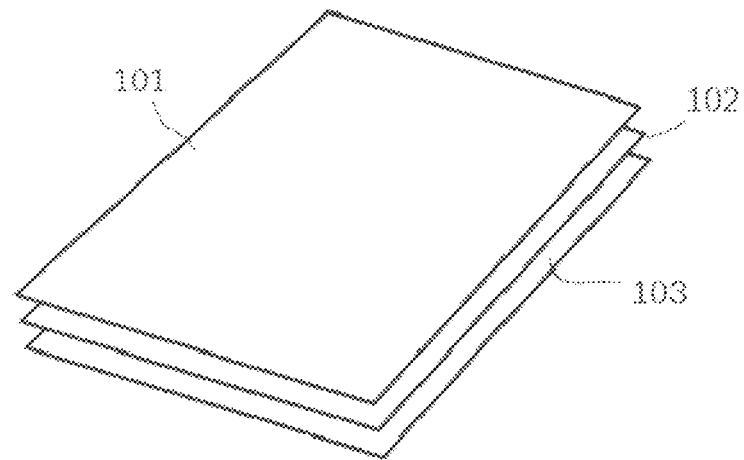
FIG. 1 illustrates the relative position of the fabric layer, the pull-string layer and the bottom layer to one embodiment of the invention.
Figure 2:
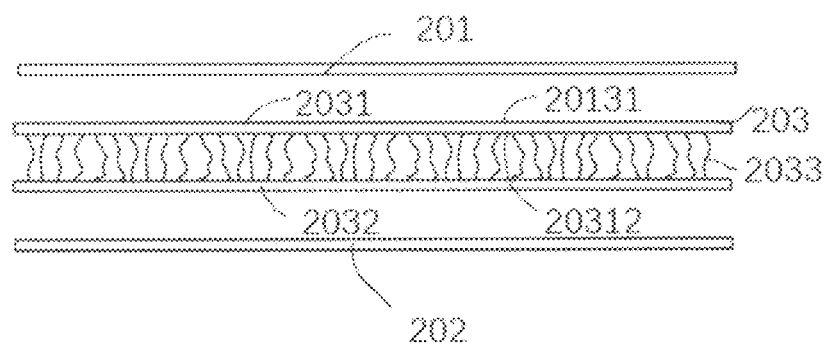
FIG. 2 is a schematic cross-sectional drawing illustrating the fabric layer, the pull-string layer and the bottom layer to one embodiment of the invention.
Figure 3:
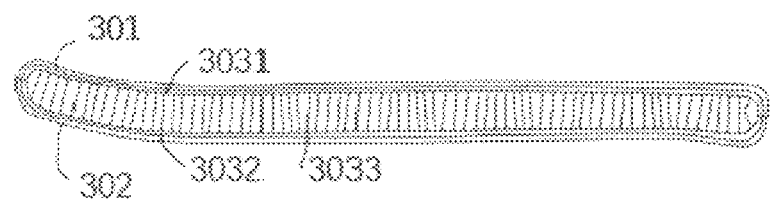
FIG. 3 is a cross-sectional drawing illustrating an aquaplane composed with the fabric layer, the pull-string layer and the bottom layer to one embodiment of the invention.
Figure 4:
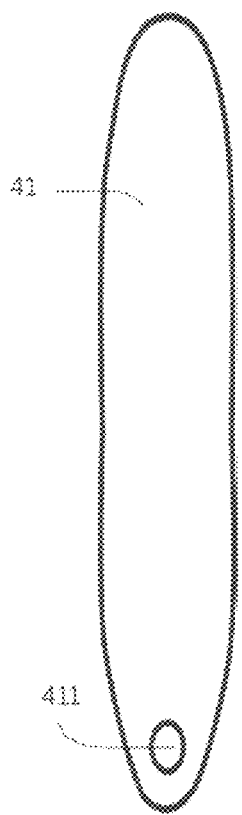
FIG. 4 is a top drawing illustrating an aquaplane to one embodiment of the invention.
Figure 5:
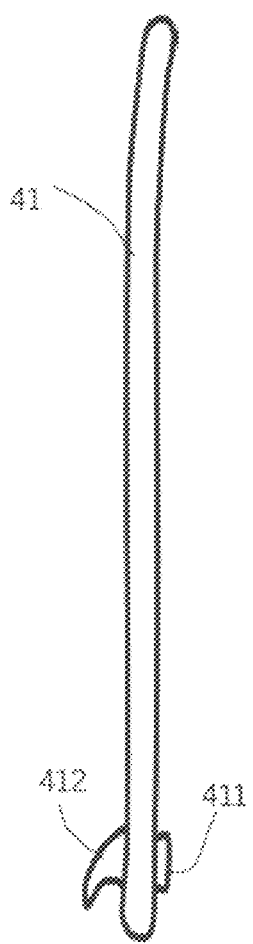
FIG. 5 is a side drawing illustrating an aquaplane to one embodiment of the invention.

Please refer to FIG. 1 to FIG. 5 for an embodiment of an aquaplane. FIG. 1 illustrates the relative position of the fabric layer, the pull-string layer and the bottom layer to one embodiment of the invention. FIG. 2 is a schematic cross-sectional drawing illustrating the fabric layer, the pull-string layer and the bottom layer to one embodiment of the invention. FIG. 3 is a cross-sectional drawing illustrating an aquaplane composed with the fabric layer, the pull-string layer and the bottom layer to one embodiment of the invention. FIG. 4 is a top drawing illustrating an aquaplane to one embodiment of the invention. FIG. 5 is a side drawing illustrating an aquaplane to one embodiment of the invention.

First, please refer to FIG. 1. The fabric layer 101, the pull-string layer 102, and the bottom layer 103 constitute basic materials for producing an aquaplane or a pool.

Then, please refer to FIG. 2, FIG. 2 is a schematic cross-sectional drawing illustrating the fabric layer 201, the pull-string layer 203 and the bottom layer 202 to one embodiment of the invention. The pull-string layer has the first pull-string layer 2031 and the second pull-string layer 2032 and multiple pull lines 2033. One end of the multiple pull lines 2033 hold the first pull-string layer 2031 and the other end hold the second pull-string layer 2032. The first surface 20131 of the first pull-string layer 2031 is bonded to the fabric layer 201. And the second surface 20132 of the first pull-string layer 2031 is opposite to the first surface 20131d, and is fixedly related to multiple pull lines. Similarly, the first surface of the second pull-string layer 2032 is bonded toward the bottom layer, and the second surface is fixedly connected to multiple pull lines 2033.

Then, please refer to FIG. 3. FIG. 3 is a cross-sectional drawing illustrating an aquaplane composed with the fabric layer, the pull-string layer and the bottom layer to one embodiment of the invention. The aquaplane includes a fabric layer 301, a bottom layer 302 and a pull-string layer. As shown in FIG. 1 and FIG. 2, the pull-string layer has a first pull-string layer 3031 bonded to the fabric layer 301. The pull-string layer has a second pull-string layer 3032 bonded to the bottom layer 302. The first pull-string layer 3031 and the second pull-string layer 3032 are respectively fixedly related to multiple pull lines 3033. The first pull-string layer 3031 and the second pull-string layer 3032 are held by multiple pull lines 3033, and an inflatable chamber is formed. When the inflatable chamber is inflated, the pull line may hold the first pull-string layer 3031 and the second pull-string layer 3032 so that the aquaplane retains the predetermined shape of the aquaplane.

In the embodiment, the fabric layer 301 and the bottom layer 302 are bonded at the edges to form the closed inflatable chamber mentioned above.

FIG. 4 is a top drawing illustrating an aquaplane to one embodiment of the invention, and FIG. 5 is a side drawing illustrating an aquaplane to one embodiment of the invention in FIG. 4. The body of the aquaplane 41 is composed of the fabric layer, the bottom layer and the pull-string layer, as shown in FIG. 3. In addition, the embodiment of the aquaplane 41 may have an accessory port 411 and a fin 412 for facilitating the operation of the aquaplane. Of course, in other to design of the aquaplane, you may install different accessories, or design different sizes and shapes.

Figure 6:
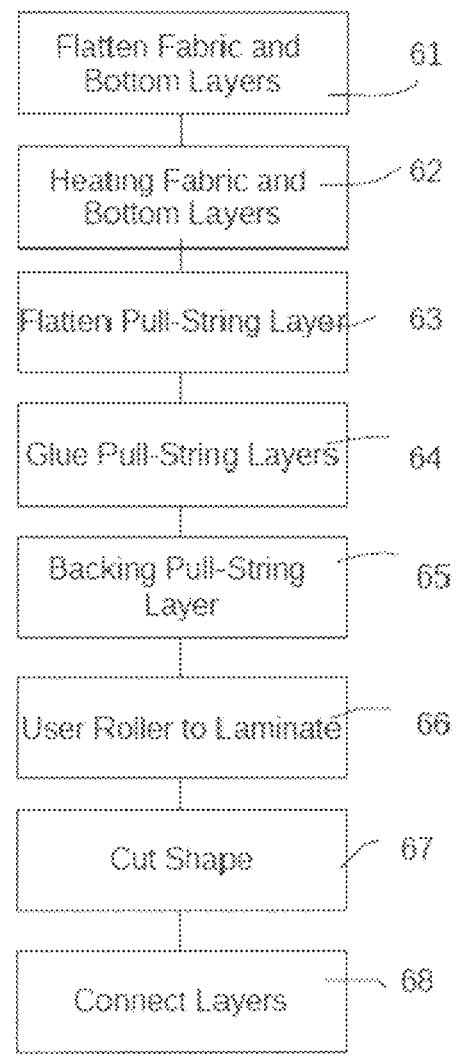
FIG. 6 is a flow chart illustrating an aquaplane making according to one embodiment of the present invention.

Please refer to FIG. 6 below. FIG. 6 is a flow chart illustrating an aquaplane making according to one embodiment of the present invention. The method of FIG. 6 may be used to make the product of FIG. 5.

First, flatten the fabric layer and the bottom layer (step 61). In order to manufacture in large quantities, the fabric layer and the bottom layer may be pre-rolled into a reel for ease of placement. The fabric layer and the bottom layer may be made of a material such as PVC, TPE (Thermoplastic Elastomer), or PU (Thermoplastic polyurethanes). The fabric layer and the bottom layer have the waterproof characteristic.

In addition, heat the fabric layer and the bottom layer (step 62), so that the surface of the fabric layer and the bottom layer may generate the melted and soft effect.

Flatten the pull-string layer (step 63), and glue the both sides of the pull-string layer (step 64). It is mentioned that flatten of the pull-string layer, the fabric layer and the bottom layer may use two or more rollers to flatten the operating area of the pull-string layer, the fabric layer and the bottom layer in order to perform heating, gluing and combining operations.

The pull-string layer has the first pull-string layer, the second pull-string layer and multiple pull lines. The both side of gluing is to glue the first surface of the first pull-string layer and the first surface of the second pull-string layer. The second surface of the first pull-string layer and the second surface of the second pull-string layer are respectively opposite surfaces of the first surface of the first pull-string layer and the first surface of the second pull-string layer. One end of each pull line is fixed and related to the second surface of the first pull-string layer. The other end of each pull line is fixed and related to the second surface of the second pull-string layer.

Baking the pull-string layer with the both sides of gluing (step 65) may evaporate solvent in the glue in order to avoid a plump phenomenon. Moreover, it may strengthen adhesion of gluing and fasten the time of gluing solidification to fasten the efficiency of the following processes through the step.

Using a roller laminates the fabric layer, the pull-string layer and the bottom layer (step 66). Through heating in advance or heating the roller of lamination makes the materials of the surface of the fabric layer melt and mix with the gluing on the surface of the first pull-string layer to produce the first fixed microstructure in order to fix and relate to the fabric layer and the first pull-string layer. Moreover, the materials of the surface of the bottom layer melt and mix with the gluing on the surface of the second pull-string layer to produce the second fixed microstructure in order to fix and relate to the bottom layer and the second pull-string layer.

After the fabric layer, the bottom layer and the glue cooling down, the fixed microstructure may let the fabric layer and the first pull line of the pull-string layer keep the condition of closing paste and may also let the bottom layer and the second pull line of the pull-string layer generate the condition of closing paste.

Cut the shape of the aquaplane from the lamination of the fabric layer, the pull-string layer, and the bottom layer (step 67).

Connecting the fabric layer and the bottom layer (step 68) makes an inflatable chamber between the first pull-string layer and the second pull-string layer. After inflating the inflatable chamber, the multiple pull lines hold the first pull-string layer and the second pull-string layer to make the inflatable chamber keep the predetermined shape of the aquaplane.

In other words, the process of making the aquaplane be done may be simplified into using the fabric layer, the bottom layer, and the pull-string layer pluses the cutting and placing the inflatable hole. Because of the inflatable way to keep the shape of the aquaplane, the aquaplane may be quite folded, blended to have higher convenience to carry after the aquaplane discharging the air from the inflatable chamber.

When practicing, the heating temperature of the fabric layer and the bottom layer may be set between one hundred and twenty degrees and two hundred degrees. The temperature may let the surface of the materials such as PVC generate the melted phenomenon of soften.

Moreover, the first pull-string layer, the second pull-string layer and the pull lines may be made in a weaving way. The first pull-string layer and the second layer respectively have multiple rugged patterns on the surface of the fabric layer and the bottom layer. The multiple rugged patterns may be made from the bump on the surface of the weaving lines. The first fixed microstructure and the second fixed microstructure are respectively inserted into multiple rugged patterns in order to produce the better fixed connecting effect.

Moreover, when practicing, it may further press the lines to the laminated fabric layer and pull-string layer. For example, pressing the surface with the bump pattern of the fabric layer and the bottom layer by the roller makes the surface of the fabric layer and the bottom layer produce some stereoscopic line structures. The pressing lines on the surface of the fabric layer and the bottom layer may strengthen the structure characteristics of the fabric layer and bottom layer.

When practicing, it may include the thing that the laminated fabric layer, pull-string layer and the bottom layer contact to the cool down wheel to lower the temperature. In other words, if there is no directly cutting for the aquaplane, it may roll the laminated fabric layer, pull-string layer and the bottom layer into the reel and store. Before rolling into the reel, the laminated fabric layer, pull-string layer and the bottom layer may pass the cool down wheel first to make the fixed microstructure have the better intensity of closing paste before rolling into the reel and cool down.

In the practicing steps, when using the roller to laminate the fabric layer, the pull-string layer and the bottom layer, adjust the tension of the roller to ten kilograms to hundred kilograms to make the laminated surface be predetermined flatted characteristic. For example, using two rollers hold two sides of the processing materials and adding quite strengthen tension to flat the fabric layer, the pull-string layer and the bottom layer makes flatter than artificial gluing. Moreover, for the diffident area of material, the gluing characteristic and the roughness on the surface, all may adjust the tension to achieve different needs of intensity and flatness.

Moreover, in the practicing steps, when using the roller to laminate the fabric layer, the pull-string layer and the bottom layer, it may heat the roller to make the surface of the fabric layer and the bottom layer become portion melted to mix with the glue more evenly and produce the first microstructure and the second microstructure. The temperature of the heated roller may be set between one hundred and twenty degrees and two hundred and twenty degrees.

Moreover, in the practicing steps, the speed of using the roller to laminate the fabric layer, the pull-string layer and the bottom layer may be set between one meter to ten meters per minute. In the speed, the fixed microstructure between the fabric layer, the pull-string layer and the bottom layer may generate the better form to achieve the exactly intensity of closing paste.

When making the aquaplane, set the inflatable hole on the surface of the fabric layer and the bottom layer and direct the air into the inflatable chamber through the inflatable hole. The inflatable hole may place a plastic and metal ring and be fixed on the fabric layer and the bottom layer by gluing or other ways.

In the practicing steps, when gluing the both sides of the pull-string layer, the pull-string layer may be stretched using a tension between ten kilograms and hundred kilograms. It is possible to make the glue more evenly by stretching with the tension.

According to another embodiment of the present invention, an aquaplane device is provided. The aquaplane device includes a fabric layer, a bottom layer and a pull-string layer.

The fabric layer and the bottom layer may be made of a material such as PVC, TPE (Thermoplastic Elastomer), or PU (Thermoplastic polyurethanes). The fabric layer and the bottom layer have the waterproof characteristic.

The surface of the fabric layer and the bottom layer have embossed pattern to increase the structural strength of the fabric layer and the bottom layer.

The pull-string layer has the first pull-string layer, the second pull-string layer and multiple pull lines. The portion surface of the fabric layer is melted and mixed with the glue on the surface of the first pull-string layer to produce the first fixed microstructure to be fixed and related to the fabric layer and the first pull-string layer. The portion surface of the bottom layer is melted and mixed with the glue on the surface of the second pull-string layer to produce the second fixed microstructure to be fixed and related to the bottom layer and the second pull-string layer.

An inflatable hole for directing air into the inflatable chamber between the first and second pull-string layers. After the inflatable chamber is inflated, the multiple pull lines hold the first and second pull-string layers so that the inflatable chamber retains a predetermined shape of the aquaplane device.

In addition to an inflatable chamber, there are two or more inflatable chambers that may be individually closed in the aquaplane, so that even if one of the inflatable chambers is perforated, the entire aquaplane may not lose buoyancy immediately, the safety of the person may be further secured. Multiple individually enclosed chambers may be blocked by means of a valve or may be set directly as an isolated inflatable chamber.

In addition, such a structure may also be used to make an inflatable pool device. The inflatable pool device has a fabric layer and a bottom layer. The fabric layer and the bottom layer may be made of a material such as PVC, TPE (Thermoplastic Elastomer), or PU (Thermoplastic polyurethanes). The fabric layer and the bottom material layer have the characteristics of waterproof.

The surface of the fabric layer and the bottom layer have embossed pattern to increase the structural intensities of the fabric layer and the bottom layer.

The pull-string layer has the first pull-string layer, the second pull-string layer and multiple pull lines. The portion surface of the fabric layer is melted and mixed with the glue on the surface of the first pull-string layer to produce the first fixed microstructure to be fixed and related to the fabric layer and the first pull-string layer. The portion surface of the bottom layer is melted and mixed with the glue on the surface of the second pull-string layer to produce the second fixed microstructure to be fixed and related to the bottom layer and the second pull-string layer.

An inflatable hole for directing air into the inflatable chamber between the first and second pull-string layers. After the inflatable chamber is inflated, the multiple pull lines hold the first and second pull-string layers so that the inflatable chamber retains a predetermined shape of the aquaplane device.

The structure may also be used in other water sports devices or inflatable mattresses and other products. The above aquaplane also includes other shapes or products that may be used with floating water, which may be held above the aquaplane, or a structure such as a backrest, a chair; all may be interpreted as the aquaplane mentioned here.

Figure 7:
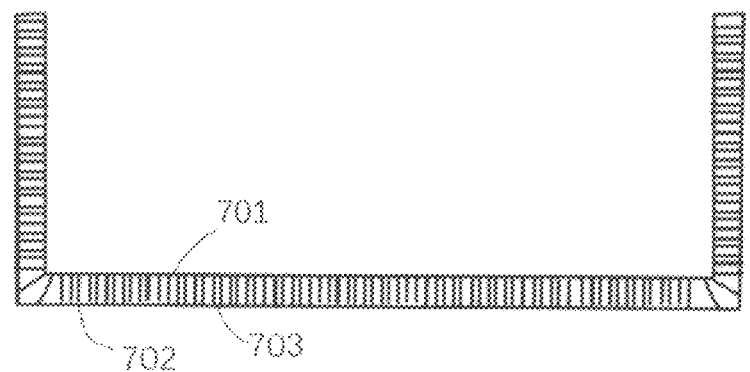
FIG. 7 is a schematic cross-sectional drawing illustrating a pool to one embodiment of the invention.

Please refer to FIG. 7, FIG. 7 is a schematic cross-sectional drawing illustrating a pool to one embodiment of the invention. The above structure may also be used to make an inflatable pool. The inflatable pool has a fabric layer 701, a pull-string layer 703, and a bottom layer 702. In this embodiment, the fabric layer 701 may be made of a more waterproof material and may have different material properties to the bottom layer 702. The pull line of the pull-string layer 703 holds the fabric layer and the bottom layer and forms an inflation chamber so that the inflation chamber passes through the pull line of the pull-string layer 703 after inflation, resulting in tension to maintain a predetermined pool shape.

Figure 8:
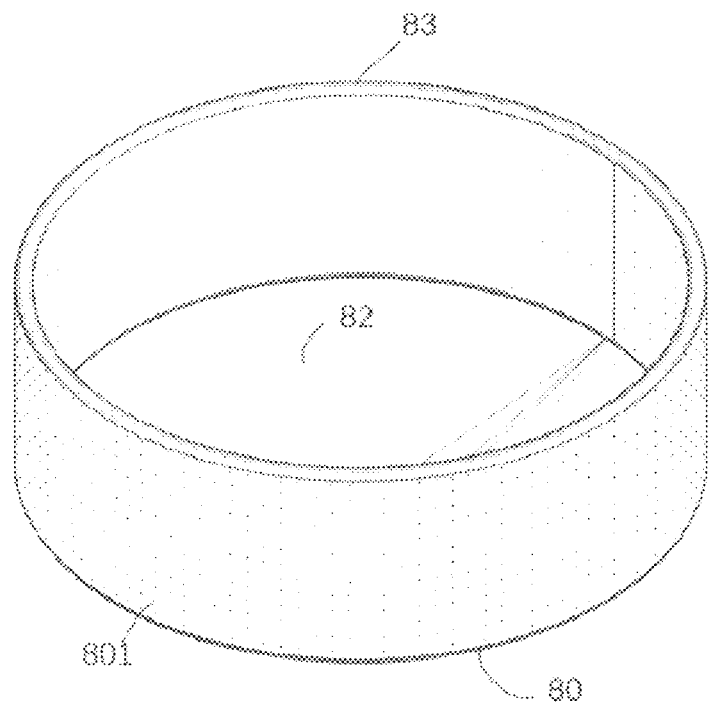
FIG. 8 is a schematic perspective drawing illustrating a pool to one embodiment of the invention.

Please refer to FIG. 8, FIG. 8 is a schematic perspective drawing illustrating a pool to one embodiment of the invention. The side walls 80 may be formed in an annular form through rectangular materials of the fabric layer, the pull-string layer and the bottom layer, and the interface may be fixed in advance or connected through a waterproof connection structure such as a waterproof zipper, or a buckle. The top may add the frame 83. The pool bottom 82 may be composed of a tarpaulin or the same material as the side wall 80. The side wall 80 has a number of indicated small points 801, each of the small points may be considered as a pull line for supporting the shape of the inflatable chamber.

Figure 9:
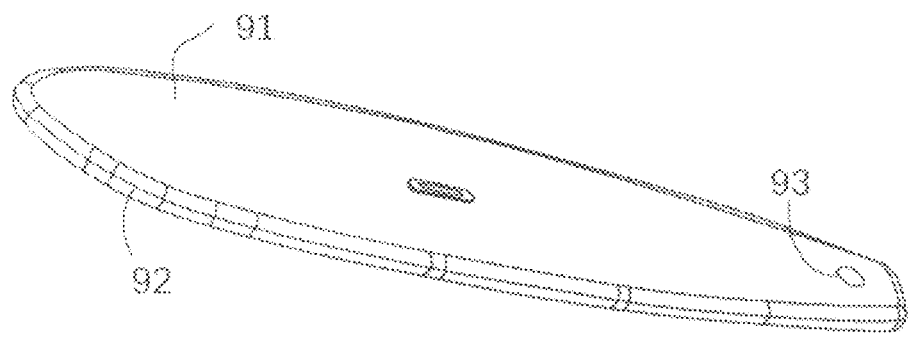
FIG. 9 is a schematic representation illustrating an aquaplane to one embodiment of the invention.

Please refer to FIG. 9, FIG. 9 is a schematic representation illustrating an aquaplane 91 to one embodiment of the invention. The embodiment of this aquaplane 91 requires only the use of the fabric layer, the pull-string layer and the bottom layer plus the cutting, and the splicing of the fabric layer with the edge-contacting position 92 of the bottom layer, such as sewing, gluing, or cooling down and other ways to complete the joint. As described above, such a structure internally constitutes an inflatable hole through which the inflatable hole 93 may be inflated so that the aquaplane is fixed to a predetermined shape. The cost of making this aquaplane may be greatly improved, and then let more people enjoy the fun of water activities.

Figure 10:
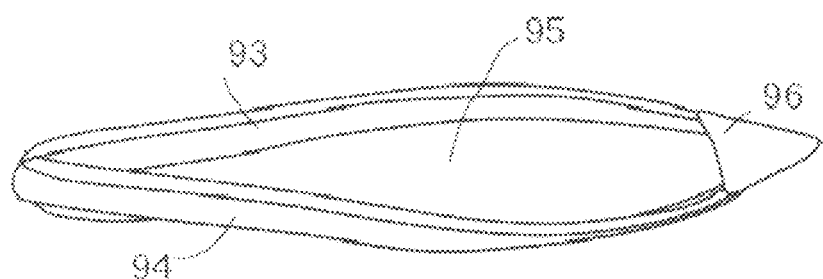
FIG. 10 is a schematic diagram illustrating another canoeing to one embodiment of the invention.

Please refer to FIG. 10, FIG. 10 is a schematic diagram illustrating another canoeing to one embodiment of the invention. The bottom 95 of the canoe may be made in a similar method of FIG. 9, and the two side walls 93, 94 may be made of similar materials to the bottom 95. In other words, the canoe only needs three pieces of the above materials layer 93, 94, 95 splicing may be formed, the cost may be significantly reduced. In particular, this material layer is easy to cut into the desired shape, it is easier to design a different shape than the plastic products. In addition to the three-layer material layers 93, 94, 95, the canoe may be provided with, for example, a structural board 96, a cord (not shown) for fixing the articles.

In addition, if it is an aquaplane, then you may weld the tail rudder to maintain stability. Also, anti-skid patches, such as crossover or lattice-like patterns, may also be added. This layer may be attached to the fabric layer, also do directly in the fabric layer surface. In addition, the aquaplane may also be provided with projections, such as one or more protrusions or ridges in the transverse direction, which may be joined to the non-slip adhesive layer for the user to step on the surface to increase the stability of the use. In addition, you may also set sail on the aquaplane. At this point, you may embed a sailboat on the aquaplane. The sailboat may be made of metal or plastic and embedded from the fabric layer into the pull-string layer or even the bottom layer.

In addition, the pull-string layer itself may be made in multi-layered, and is not limited to the above illustrative example. For example, the two pull lines are laminated together to form two inflatable chambers, and both sides are added to the fabric layer and the bottom layer is also an implementation of the deformation. Alternatively, the leak-proof gas is treated on the surface of the pull-string layer, and the inflation chamber is isolated into multiple independent regions, and is also a practical deformation.

In addition, the inventors have found that it would be more helpful to provide a better product if the material layers may be designed in the following methods.

First, as the material layer for water activities, it is preferable that the weight per square meter is between one thousand and nine hundred and three hundred and thirty grams, and the length of the upper and lower layers is preferably between zero point six and two millimeters.

The length of the pull line may be designed into several specifications, such as forty five millimeters, ninety five millimeters, hundred and five millimeters, hundred and fifteen millimeters, hundred and forty five millimeters and so on. The length of the pull line may have some error, but preferably within three millimeters. In addition, although the length of the pull line may be used to design the aquaplane, but also in the production of the pull-string layer when the corresponding consideration to the corresponding position of the aquaplane or other structures, so that the pull-string layer directly have different lengths. In other words, through this approach may make the inflatable thickness in different places have different effects of the product. Through this approach, you may design a product with more sense of design and have better strength characteristics.

The height after being inflated, for example, after filling 12PSI, the height of the entire material layer is preferably for fifty millimeters, hundred millimeters, hundred and five millimeters, hundred and fifteen millimeters, hundred and forty five millimeters.

In addition, because the pull-string layer provides the function of inflatable chamber, airtight design is also a main point. A preferred test method for applications such as aquaplane includes sealing the fabric layer with the bottom layer and inflating the inflatable chamber of the pull-string layer. The inflation pressure may be set to seven PSI for example for three days, and/or to do the repeated charge and discharge test. In the repeated charge and discharge test, you may use a higher pressure, such as one point five times the eleven PSI to inflatable chamber for inflation and deflation test.

The aquaplane for surfing, you may set a higher air pressure to bring a higher overall hardness, in line with the characteristics of aquaplane required for surfing. For example, fill with ten to fifteen PSI air pressure inside the aquaplane.

Figure 11:
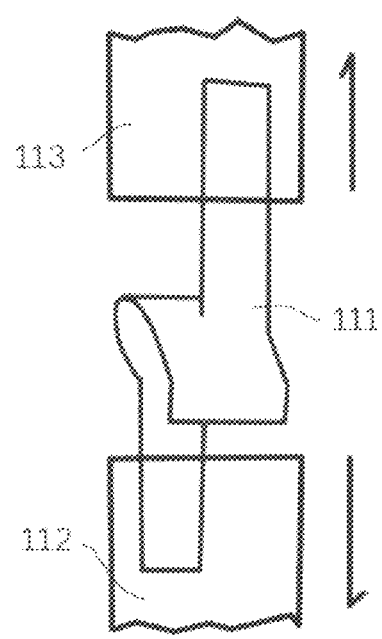
FIG. 11 is a schematic diagram of the test tear parameters.

Please refer to FIG. 11, FIG. 11 is a schematic diagram of the test tear parameters. In order to avoid being cut by water creatures such as sharks or sharp reefs, the material layer composed by the fabric layer, the pull-string layer and the bottom layer also needs to have a tear-resistant property. In the preferred embodiment of FIG. 11, the material layer 111 composed by the fabric layer, the pull-string layer and the bottom material layer is cut into a small slice such as a width of five centimeters, a length of twenty centimeters, an intermediate cut of ten centimeters, and then a force is applied on both sides. It is best to be able to withstand more than eighty Newtons in different directions, and the tension will not tear. On the other hand, if it is directly on both sides of the pull off, it is best to withstand more than seven hundred Newton pull and may not be pulled off.

Figure 12:
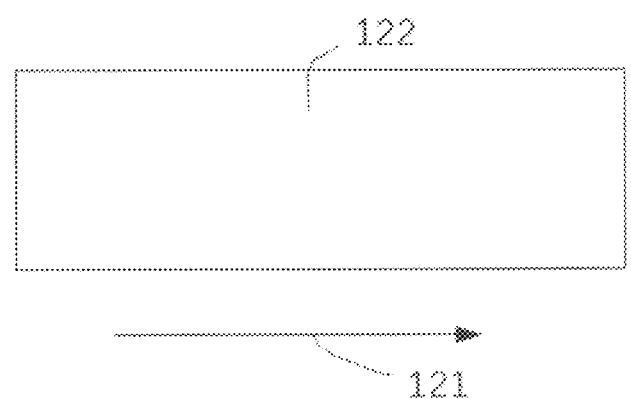
FIG. 12 shows a material layer 122 of a fabric layer, a pull-string layer and a bottom layer.

Please refer to FIG. 12, FIG. 12 shows a material layer 122 of a fabric layer, a pull-string layer and a bottom layer. As described above, the material layer may be rolled up for storage, and followed by a crimping direction 12. After being rolled up, the fabric layer and the bottom layer is able to reach the intercept of three centimeters by twenty centimeters of the sample, the ability of pull of stripping in the horizontal and vertical may be able to withstand seventy to hundred and eighty every three centimeters Newton (N/3CM) pull.

Figure 13:
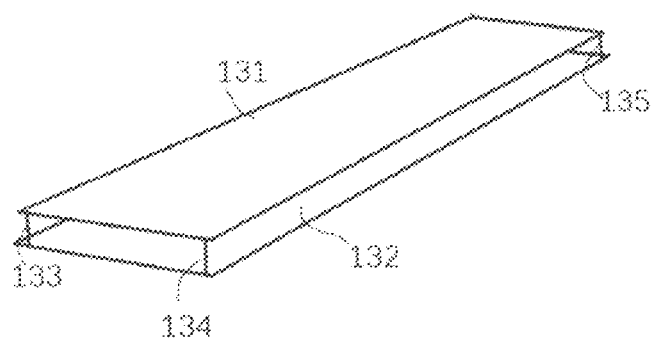
FIG. 13 shows the preferred parameters for the length of the pull line.

Please refer to FIG. 13, FIG. 13 shows the preferred parameters for the length of the pull line. In FIG. 13, the first pull-string layer 131 and the second pull-string layer 132 of the pull-string layer have the pull line 133, the pull line 134, and the pull line 135 in the middle; and wherein the distance between the pull line 133 and the pull line 134 is hundred and fifty centimeter, and the difference between the lengths of the two is preferably not more than five millimeters. The distance between the pull line 134 and the pull line 135 is three hundred centimeters, and the difference between the lengths of the pull line 134 and the pull line 135 is preferably not more than fifteen millimeters.

Figure 14:
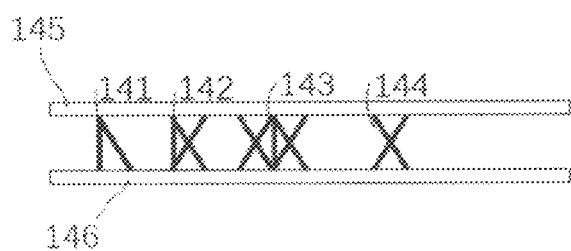
FIG. 14 illustrates several different ways of setting the pull lines.

In addition to the vertical arrangement of the pull line in FIG. 13, FIG. 14 illustrates several different ways of setting the pull lines. As described above, the pull line may cause the first and second pull-string layers to maintain a predetermined shape after being inflated. It is an alternative to pull the lines to be perpendicular to the pull-string layer. In addition, as shown in FIG. 14, several pull lines configurations 141, 142, 143, 144 are additional options. For example, in the pull line configuration mode 141, a vertical pull line is also paired with an oblique pull line. In the pull line arrangement 142, staggered oblique lines are more configured. In the pull line arrangement 143, more oblique lines may bring about different characteristics of stability and elasticity. In the pull line configuration 144, the two oblique lines replace the original vertical pull line, which is another way to bring different characteristics.

There are various possibilities for the use of aquaplane. Therefore, in the different consideration such as hardness, flexibility, safety and other factors, not only the vertical pull line, but also other non-vertical pull line configuration, may make the overall elasticity or strength.

In addition, since one of the main features of the aquaplane product is the ability to keep floating in water. Therefore, the overall configuration of the better parameters may be cut, for example, ten centimeters long and wide nutrient to be inflated, and put the corresponding weight, for example, the average weight of adults corresponding to the distribution of the weight of this area. Then put into the water, it is better to keep the surface at least four centimeters wide.

The parameters of the preferred embodiment are the result of repeated experiments and demonstrating that the preferred use characteristics may be achieved. Therefore, the designer may adjust a specific gravity of the material, length, gluing material, and the temperature in the process of pasting to achieve the above control parameters to make a better aquaplane, and these findings should also belong to the scope of invention protection.

The statement above just for the better embodiment, not for limiting the present invention. All the modification, equal to any change and improvement that are based on the present invention's spirit and principle, may be protected in the present invention protection range.

The invention claimed is:

1. An aquaplane device comprising:
   a fabric layer having a waterproof characteristic;
   a bottom layer having the waterproof characteristic;
   a pull-string layer having an airtight characteristic and including a first pull-string layer, a second pull-string layer and a plurality of pull lines, a portion of a material on a surface of the fabric layer having a first fixed microstructure defined by a mixture containing a glue and a melted fabric layer to fixate the fabric layer to the first pull-string layer, and a portion of a material on a surface of the bottom layer having a second microstructure defined by a mixture containing a glue and a melted bottom layer to fixate the bottom layer to the second pull-string layer; and
   an inflatable hole, for guiding an air into an inflatable chamber between the first pull-string layer and the second pull-string layer, after inflating the inflatable chamber, the plurality of the pull lines holding the first pull-string layer and the second pull-string layer to make the inflatable chamber keep a predetermined shape of the aquaplane device.

2. The aquaplane device of claim 1, wherein the materials of the fabric layer and the bottom layer are PVC.

3. The aquaplane device of claim 1, wherein the surface of the fabric layer and the bottom layer have embossed lines to strengthen structural intensities of the fabric layer and the bottom layer.

* * * * *